June 22, 1943.  Z. E. KEOUGH  2,322,454
RESILIENT WHEEL CONSTRUCTION
Filed March 5, 1942   2 Sheets-Sheet 1

Z. E. Keough INVENTOR.
BY CAKnowles

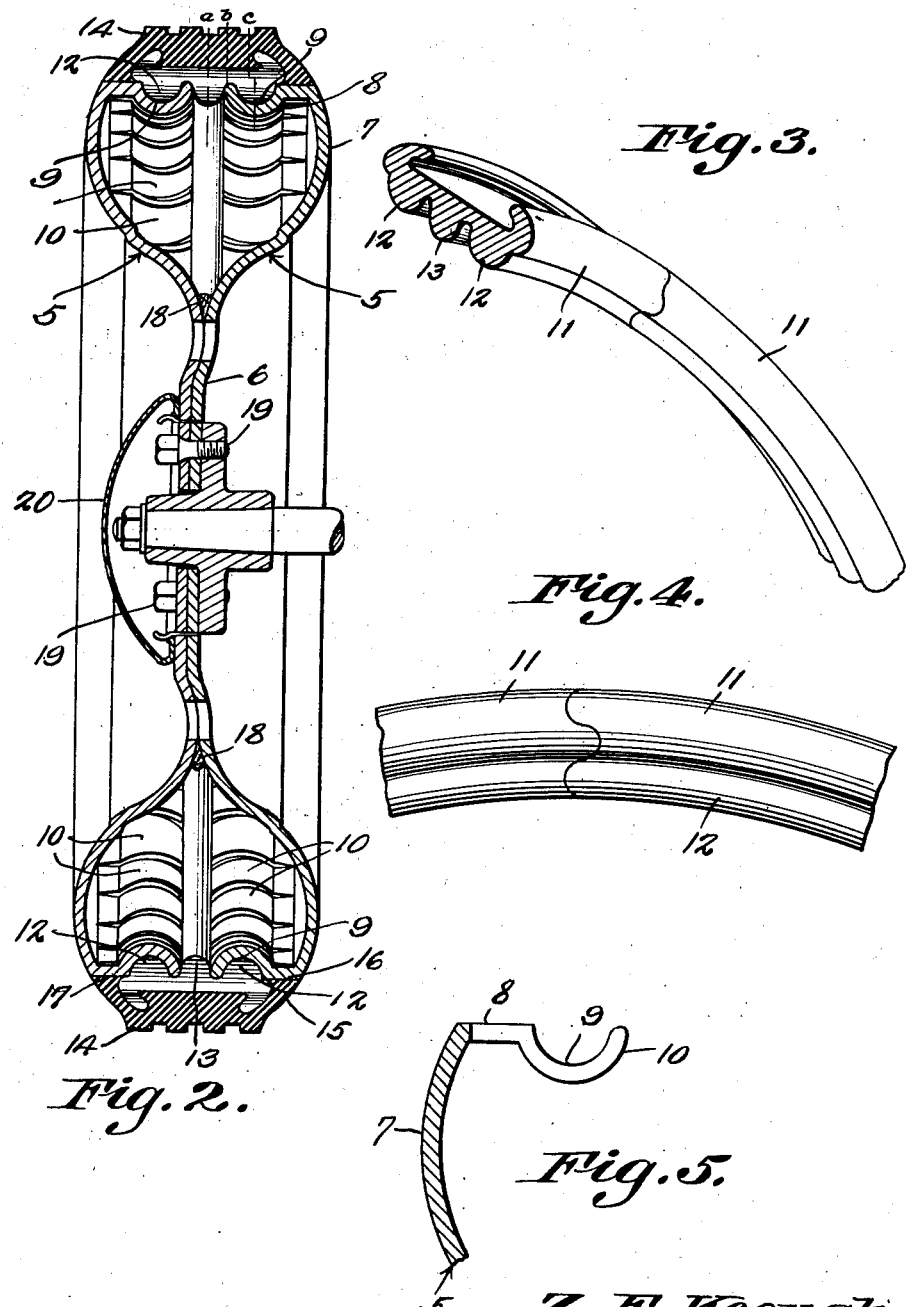

Patented June 22, 1943

2,322,454

UNITED STATES PATENT OFFICE 2,322,454

RESILIENT WHEEL CONSTRUCTION

Zachariah E. Keough, Mansfield, Ohio

Application March 5, 1942, Serial No. 433,500

8 Claims. (Cl. 152—12)

This invention relates to resilient tire and wheel construction, the primary object of the invention being to provide a motor vehicle wheel having resilient qualities comparable with the resiliency afforded by the use of the well known pneumatic tires.

An important object of the invention is to provide a wheel of this character which will be puncture proof, as well as damage proof, to the end that the life of the wheel will be as great, if not greater than the vehicle on which the wheel is mounted.

Still another object of the invention is the provision of a wheel having a tread identical with the treads now commonly used on pneumatic tires, thereby insuring the necessary traction for efficient operation of the wheel during travel, or in braking.

Another object of the invention is to provide a wheel which will be exceptionally strong and durable, due consideration having been given to the construction of the wheel to maintain the weight of the wheel at a minimum, for efficient operation and practicability.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 2 is a vertical sectional view through the wheel.

Figure 3 is a perspective view illustrating the contacting ends of the sections of tread band, forming a part of the wheel construction.

Figure 4 is a side elevational view illustrating the cooperating ends of the tread band sections.

Figure 5 is a fragmental sectional view of one side of the felloe of the wheel.

Figure 1:
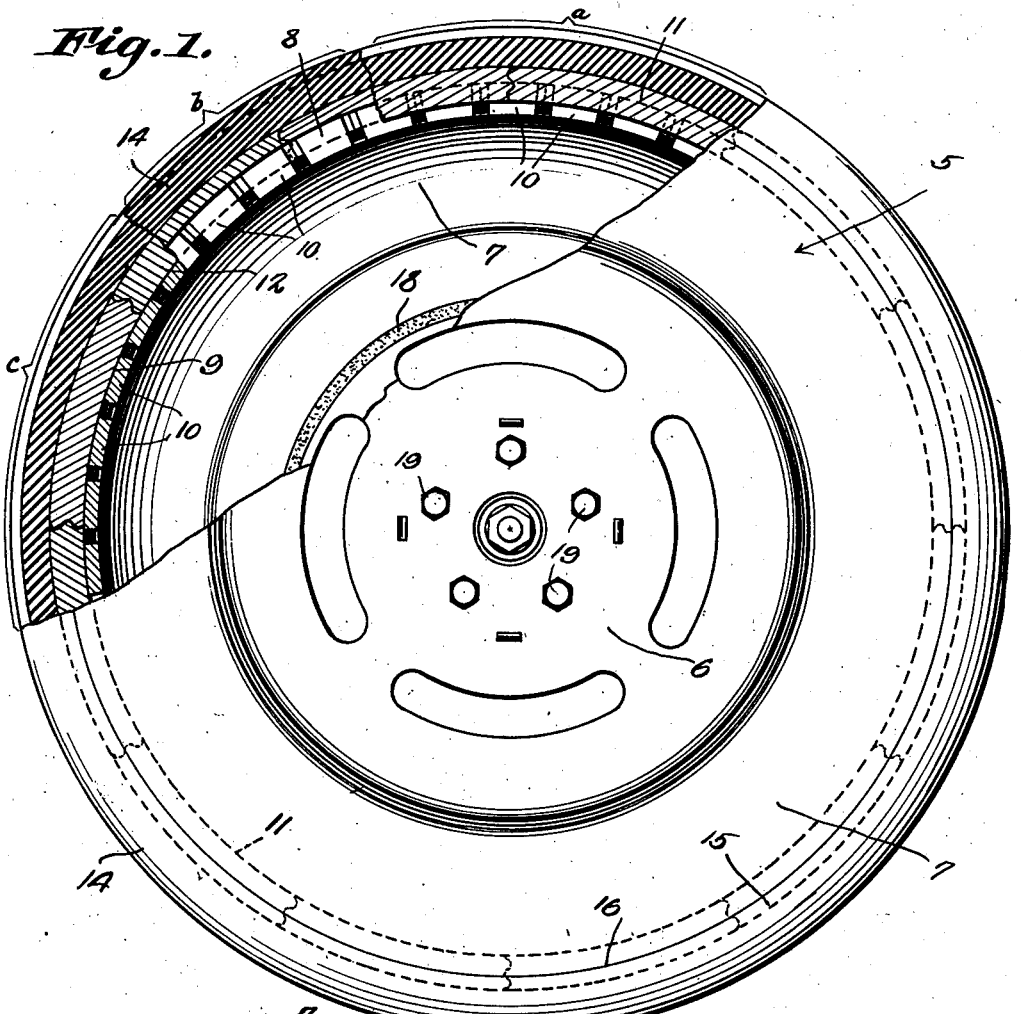
Figure 1 is an elevational view of a wheel constructed in accordance with the invention, parts of the wheel being shown in section, the cutting planes being indicated by lines on Figure 2 of the drawings, the lines being lettered corresponding with lettered brackets shown in Figure 1.
Figure 6:
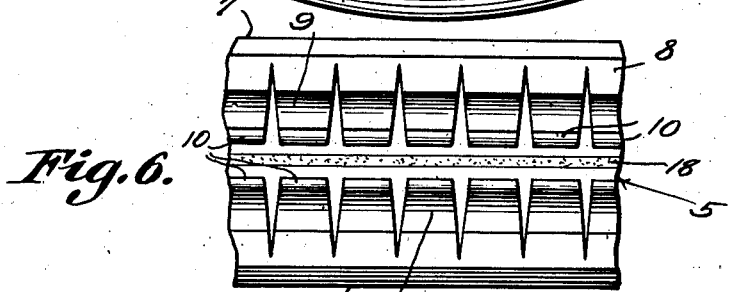
Figure 6 is a fragmental plan view of the felloe.

Referring to the drawings in detail, the wheel comprises disk-like sections indicated generally by the reference character 5, the sections being constructed of spring steel material and passed through a stamping and forming machine to provide flat hub sections 6 and bulged portions 7. These bulged portions 7, when the sections are secured together, provide the portion of the wheel simulating the tire.

Each of the sections 5 is formed with an inwardly extended annular flange 8, the flanges being of lengths so that the adjacent inner edges thereof will be spaced apart, as clearly shown by Figure 2 of the drawings.

An annular groove indicated at 9 is formed in each of the annular flanges, and as shown, the annular flanges are split, the split portions extending inwardly from the free edges thereof, and terminating at points near the bulged portions 7. These split portions define what might be termed independent fingers capable of flexing with respect to each other, to lend resiliency to the tread portion of the wheel.

Mounted on the felloe is the tread portion of the wheel, which embodies a plurality of curved sections 11 which have curved interlocking ends, to permit of free movement of one section with respect to the other, but at the same time insure the sections 11, being held together. These sections are formed with annular enlargements 12 that fit in the annular grooves of the flanges 8, as shown by Figure 2. Between the annular enlargements 12 is another annular enlargement 13 which is of a width to closely fit between the adjacent ends of the fingers 10 of the opposed sections, holding the fingers spaced apart at all times preventing movement of the fingers at opposite sides of the wheel, from moving toward each other.

The outer surface of the tread band is formed with a groove to receive the tread portion 14 of the tire, which is constructed preferably of rubber, the groove which receives the tread portion 14 being of the well known clincher type, to rigidly secure the tread portion to the tread band. As shown more clearly by Figure 2 of the drawings, the tread portion has side walls 15 that cover the outer edges of the tread band and merge into the bulged portions 7. It might be further stated that the disk-like sections are formed with substantially flat portions 16 adjacent to the bulged portions 7, and accommodate the shoulders or inner edges of the tread portions 17 bracing the tread portion at its point of contact with the wheel proper.

It will of course be understood that the disk-like sections 5 are welded together at 18, or at a point adjacent to the hub sections where the greatest amount of strength is required.

The usual bolt openings are formed in the hub sections so that the wheel bolts which are indicated at 19, may be employed in securing the wheel in position on the permanent hub section, which fits the axle of the vehicle.

The reference character 20 designates the usual hub cap which is mounted in the well known manner.

From the foregoing it will be seen that due to the construction shown and described, pressure directed to the tread of the wheel, will be transmitted to the bulged portions 7 of the wheel which, due to the resiliency of the spring steel of which the sections are constructed, will flex under the force, and will immediately return to the normal position. The flexing of the bulged portions 7 is insured by the fact that pressure directed to the tread, will prevent the fingers 10 from moving toward each other, distributing the pressure throughout the entire circumference of the wheel. It will further be seen that because of the connection between the sections of the tread band, the band may flex readily under a severe blow, and will immediately return to its normal position.

When the tread portion 14 becomes worn, it is obvious that the tread portion may be readily replaced eliminating the necessity of replacing other portions of the wheel.

By the construction, it will be obvious that I have provided a resilient wheel which will have resilient qualities comparable with the resiliency afforded by the usual pneumatic tire, and at the same time provide a structure which will be puncture proof, as well as damage proof.

Having thus described the invention, what is claimed is:

1. A resilient wheel comprising disk-like sections constructed of spring steel material, and formed with hub sections and bulged portions adjacent to the outer edges thereof, the sections being secured together at the hub portions thereof, inwardly extended flanges formed at the outer edges of the disk-like portions, providing a felloe, said flanges having annular grooves formed therein, a tread band having enlargements, fitted in the annular grooves, a central annular enlargement formed on the tread band and resting between the adjacent edges of the flanges in contact therewith, holding the flanges spaced apart, and a rubber tread member secured on the tread band, adapted to secure the tread band in position.

2. A resilient wheel comprising disk-like sections constructed of spring steel material and formed with hub sections and bulged portions adjacent to the outer edges thereof, the sections being secured together at the hub portions thereof, inwardly extended flanges formed at the outer edges of the disk-like sections, said flanges being split transversely, providing a plurality of independent fingers, said flanges having annular grooves, a tread band having enlargements fitted in the grooves, securing the tread band in position, and a rubber tread portion secured to the tread band, and adapted to hold the tread band in position on the disk-like sections.

3. A resilient wheel comprising disk-like sections constructed of spring steel material, said sections being formed with hub sections and bulged portions adjacent to the outer edges thereof, the sections being secured together at the hub portions thereof, inwardly extended flanges formed at the outer edges of the disk-like sections providing a felloe, said flanges being transversely split from their free edges providing a plurality of independent flexible fingers, a tread band positioned on the felloe, an annular enlargement on the tread band disposed between the free ends of the fingers, holding the fingers in spaced relation with respect to each other, and a tread portion constructed of rubber, secured to the tread band, and adapted to secure the tread band in position.

4. A resilient wheel comprising disk-like sections constructed of spring steel material formed with a hub section and bulged portions adjacent to the outer edges thereof, the sections being secured together at the hub portions thereof, inwardly extended flanges formed at the outer edge of the disk-like sections providing a felloe, the free edges of adjacent flanges being spaced apart, a tread band mounted on the felloe, an annular enlargement on the tread band fitted between the flanges in contact therewith and adapted to hold the flanges spaced apart, and a rubber tread section secured to the tread band, adapted to secure the tread band in position.

5. A resilient wheel comprising disk-like sections constructed of spring steel material and formed with hub portions and bulged portions adjacent to the outer edges thereof, the sections being secured together at the hub portions, inwardly extended flanges formed at the outer edges of the sections, the free edges of said flanges being spaced apart and adapted to provide a felloe, a tread band embodying a plurality of sections having interengaging ends, adapted to move with respect to each other, fitted on the felloe, a portion of the tread band extending between the adjacent edges of the flanges, and a rubber tread section secured to the tread band, and adapted to hold the tread band in position.

6. A resilient wheel comprising disk-like sections constructed of spring steel material and formed with hub portions, the hub portions adapted to be secured together in the construction of the wheel, said sections having bulged portions adjacent to the outer edges thereof, inwardly extended flanges formed at the outer edges of the sections, said flanges having annular grooves formed in the outer surfaces thereof, a tread band embodying a plurality of curved sections having interengaging ends, fitted on the inwardly extended flanges, an annular enlargement formed intermediate the side edges of the tread band and fitted between the adjacent edges of the inwardly extended flanges, holding the flanges spaced apart, annular enlargements formed on the tread band and adapted to be positioned within the annular grooves of the flanges, holding the tread band in position by frictional contact with the flanges, and a rubber tread portion secured to the said band and adapted to hold the tread band in position.

7. A resilient wheel comprising disk-like sections constructed of spring steel material and formed with hub portions and bulged portions adjacent to the outer edges thereof, said sections being secured together at the hub portions, inwardly extended flanges formed at the peripheries of the sections, the inner ends of said flanges being spaced apart, said flanges being split providing a plurality of independent spring fingers, a sectional tread band mounted on the flanges and held in position by frictional contact with the flanges, the outer surface of said tread band being grooved, and a rubber tread section fitted within the groove of the tread band, and adapted to secure the tread band in position.

8. A resilient wheel comprising disk-like sections constructed of spring steel material and formed with hub portions and bulged portions adjacent to the outer edges thereof, said sections being secured together at their hub portions, inwardly extended curved flanges formed at the outer edges of the disk-like sections, the adjacent edges of the curved flanges being spaced apart, a sectional tread band mounted on the flanges, a curved enlargement on the tread band closely fitted between the adjacent edges of the flanges, holding the flanges in predetermined spaced relation with respect to each other, and a rubber tread section mounted on the tread band.

ZACHARIAH E. KEOUGH.